United States Patent

[11] 3,633,870

[72] Inventor Friedrich Bayer
 Deilinghofen, Germany
[21] Appl. No. 866,539
[22] Filed Oct. 15, 1969
[45] Patented Jan. 11, 1972
[73] Assignee Friedrich Grohe Armaturenfabrik
 Hemer, Germany

[54] WATER REGULATING VALVE
 5 Claims, 3 Drawing Figs.
[52] U.S. Cl...................................................... 251/270,
  251/355
[51] Int. Cl...................................................... F16k 31/50
[50] Field of Search........................................... 251/355,
  266, 270; 137/298

[56] References Cited
 UNITED STATES PATENTS
 2,139,280 12/1938 McBride....................... 251/355 X
 2,224,447 12/1940 Penick et al. .................. 251/355 X
 3,223,110 12/1965 Mueller et al................... 137/298
 FOREIGN PATENTS
 1,132,623 3/1957 France .......................... 251/270
 56,005 4/1911 Germany....................... 251/266
 1,077,928 3/1960 Germany....................... 251/266
 3,563 2/1899 Great Britain................. 251/270

Primary Examiner—M. Cary Nelson
Assistant Examiner—R. B. Rothman
Attorney—Michael S. Striker ABSTRACT: An upper valve portion arrangement used for regulating water flow, in which a threaded valve rod is located within the body of the valve and maintains two chambers spaced from each other. The chambers communicate through a duct in the form of a notch or bore in the threaded portion of the valve rod. Two O-rings are provided with one O-ring within the valve body about a cylindrically shaped guide portion of a tapered sleeve located within the interior of the valve body. This O-ring serves to seal off the threaded portion of the valve rod, from the water passing through the valve.

PATENTED JAN 11 1972   3,633,870

INVENTOR
FRIEDRICH BAYER
by: Michael J. Striker
ATTORNEY

WATER REGULATING VALVE

BACKGROUND OF THE INVENTION

The present invention relates to an improvement in the upper portions of valves in which a tapered sleeve moves up and down on a valve rod. The valve design of the present invention is particularly applicable to washrooms, and the present invention resides in the feature of increasing the operating life of the upper portion of such valves.

For the purpose of decreasing the wear on the valve rod threaded portion, it is known in the art to arrange below the valve rod thread, the O-sealing ring which is required for sealing with respect to the exterior. Through such sealing with respect to the exterior, the valve rod thread is secured against the application of water thereto. The operating life of the upper portion of the valve depends upon the degree of wear of the valve rod thread.

All of the designs known in the art are based on the logical approach that below the edge guide of the tapered sleeve, a cylindrical member is arranged in a corresponding further bore member of the body and guided therein. The sealing O-ring is arranged in or on this cylindrical member. Whereas with such design, the access of water thereto is prevented, the dry operation of the valve rod thread is, however, not prevented. This is due to the condition that the lubricating medium is pressed into the outer lying guide edge where it is, of course, useless for purposes of lubricating the valve rod.

The present invention avoids this undesired situation by providing that the upper portion of the tapered sleeve is in the form of a cylindrical guide member within which a body bore prevails of identical diameter. A further O-sealing ring is arranged with the body bore. This design is used in conjunction with the retention of the upper O-sealing ring lying below the abutting collar of the valve rod. The further O-sealing ring connects with the lower portion of the tapered sleeve carried by the edge guide. With this design, closed-off spaces are created above and below the valve rod threaded portion. At the same time, these confined spaces are advantageously made to communicate with each other through an axial notch in the threaded portion itself. With this arrangement, the desired feature is achieved that prior to assembling the valve arrangement, the lubricating medium is introduced into the hollow portion of the tapered sleeve. When the tapered sleeve is then turned up and down, the lubricating medium is pressed alternatingly into the upper and lower chambers or spaces, past the threaded portion. As a result, continuous lubrication is realized, and dry operation of the threaded portion for any length of time is avoided.

SUMMARY OF THE INVENTION

An arrangement for valves used to regulate fluid flow particularly in washrooms. A valve body contains a valve rod which has a threaded portion lying between upper and lower chambers confined within the valve body. A notch in the threaded portion serves as a duct by which the two spaced chambers may communicate. A bore may be used in place of the duct. One O-ring is located on the valve rod, and a tapered sleeve is further provided with a cylindrically shaped guide portion within the interior of the valve body. A second O-ring within the valve body and engaging the cylindrically shaped guide portion is used to seal off the threaded portion from being acceptable to the fluid or water flow being regulated by the valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
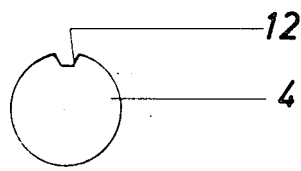
FIG. 2 is a plan view taken from below of the threaded portion of the valve rod.
Figures 1, 3:
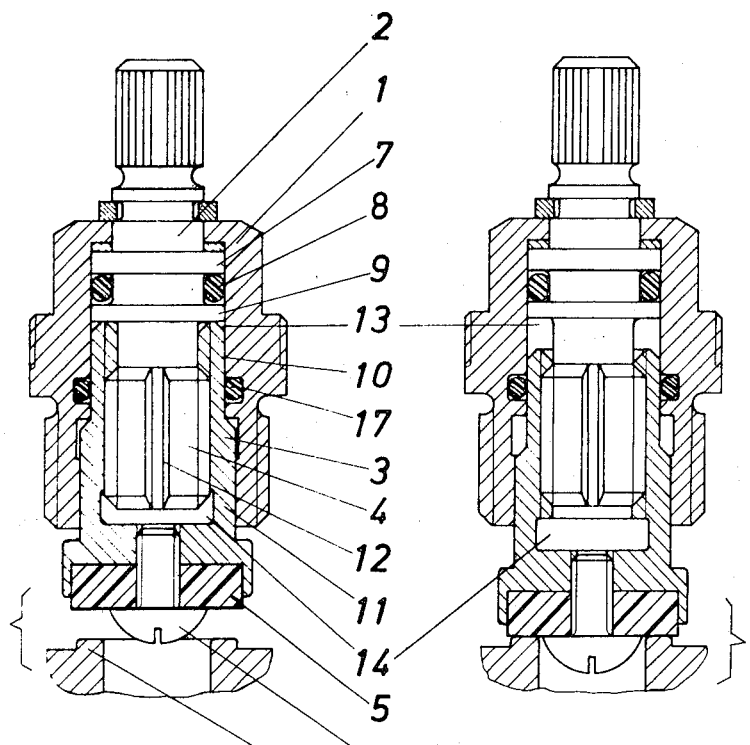
FIG. 1 is a sectional view through the longitudinal axis of the valve and shows the valve in open position, in accordance with the present invention.
FIG. 3 is a sectional view taken through the longitudinal axis of the valve and shows the latter in closed position, in accordance with the present invention.

Referring to the drawing, FIG. 1 shows an advantageous embodiment of the upper portion of the present invention in a vertical section. The upper portion member is denoted by 1, whereas the valve rod is 2, and the tapered sleeve 3 moves up and down with the threaded valve rod member 4. The sealing disc 5 is secured to the tapered sleeve through the roundhead screw 15. The valve seat is represented by the numeral 6. The valve rod which is inserted into the valve body carries a shoulder 7 which, in turn, carries the O-ring 8. The valve rod is inserted into the valve body from below, and is located within the valve body by abutting thereinto. The exterior of the O-ring 8, serves to seal the valve body bore. The upper portion of the tapered sleeve is in the form of a round guide portion or guide member 10 within the valve body, and cooperates with the second O-ring 17. The lower portion carries the edge guide 11, with which the tapered sleeve is secured against rotation. The axial notch 12 is cut or arranged on the threaded valve rod 4. Through this notch 12, the space 13 confined by the upper portion of the threaded valve rod communicates with the space 14 lying below.

The advance in the art through the present invention resides in the following advantages: From the outside, the valve rod is protected, as in the past, through two O-ring fields against water which may seep through. While, on the one hand, the valve rod is secured against the transmission of water, continuous lubrication of the valve rod is, on the other hand, achieved. As a result of such lubrication, the danger of dry operation of the valve is avoided, and the operating life of the upper portion is substantially increased.

In contrast with the upper portion provided on the valve rod shoulder with two O-ring fields, a deterioration of loss in the sealing feature, or increase in the structural height is not incurred. This results from the condition that a savings in the structural height is realized, as desired, through omission of the second lower O-ring on the valve rod. This desired savings in structural height is made available for the additional sliding guide portion with an O-ring seal at the tapered sleeve. The sliding guide portion becomes further improved through the pulling apart of the O-rings 8 and 17. A turning torque on the valve rod, moreover, is substantially eliminated. In addition, the guide bore for the valve rod shoulder or collar and the sliding guide member of the tapered sleeve may be enlarged, without enlarging the body diameter of the upper portion of the valve. In this manner, the specific bearing pressure of the valve rod collar against the body is reduced, and consequently the amount of wear is reduced correspondingly. Finally, by increasing the length of the valve rod by approximately 50 percent, the load of the threaded portion is reduced by 20 percent, and this has a further effect on increasing the operating life of the upper portion.

It will be understood that each of the elements described above, or two or more together, may also find a useful application in other types of constructions differing from the types described above.

While the invention has been illustrated and described as embodied in valves, it is not intended to be limited to the details shown, since various modifications and structural changes may be made without departing in any way from the spirit of the present invention.

What is claimed as new and desired to be protected by Letters Patent is set forth in the appended claims.

1. In a valve arrangement for regulating fluid flow, a combination comprising a valve housing body formed with an axially extending stepped cylindrical bore having an upper portion of a diameter smaller than the lower portion thereof; valve rod means mounted in said bore turnable about the axis thereof and immovable in axial direction, said valve rod means having an upper portion of a diameter smaller than that of said upper bore portion and a lower portion provided with an outer screw thread; sleeve means axially slidably arranged in said bore and having a lower closed end and an inner screw thread threadingly engaged with said outer screw thread of said valve rod means, said sleeve means having an upper cylindrical guide portion guided in said upper bore portion, a lower substantially cylindrical portion of a greater diameter than said upper cylindrical portion of said sleeve means and located in said lower bore portion, and an upwardly tapering intermediate portion integral with said upper and lower portions, said upper portion of said valve rod means and said valve housing body defining a first chamber above said sleeve means and the latter defining between its closed end and the lower portion of said valve rod means a second chamber, each of which being adapted to be filled with lubricating means; passage means providing communication between said chambers; a first O-ring in said upper bore portion about said upper portion of said valve rod means; and a second O-ring in said upper bore portion and sealingly engaging said upper cylindrical guide portion of said sleeve means.

2. A combination as defined in claim 1, wherein said passage means comprises an axially extending notch in said threaded portion of said guide rod means.

3. A combination as defined in claim 1, wherein said upper portion of said guide rod means is provided with a pair of axially spaced radially extending shoulders engaging the inner surface of said bore, said first O-ring being located between said shoulders.

4. A combination as defined in claim 3, wherein the portion of said bore engaged by said shoulders and the portion thereof engaged by said upper cylindrical guide portion of said sleeve means have the same diameter.

5. A combination as defined in claim 1, and including a sealing disc mounted on the lower closed end of said sleeve means, and a valve seat axially aligned with said disc, so that the disc may engage or be spaced from said seat during axial movement of said sleeve means.

* * * * *